United States Patent [19]

Stout

[11] Patent Number: 4,536,986
[45] Date of Patent: Aug. 27, 1985

[54] METHOD OF CONSTRUCTION OF SKIRT FOR FISHING LURES

[76] Inventor: Larry E. Stout, 9240 Carmel Rd., Atascadero, Calif. 93422

[21] Appl. No.: 574,396

[22] Filed: Jan. 27, 1984

[51] Int. Cl.³ .............................................. A01K 85/08
[52] U.S. Cl. .................................. 43/42.27; 43/42.28; 43/42.53; 43/42.11
[58] Field of Search ................. 43/42.11, 42.15, 42.53, 43/44.2, 44.8, 42.25, 42.13, 42.08, 42.26, 42.27, 42.28

[56] References Cited

U.S. PATENT DOCUMENTS

| | | | |
|---|---|---|---|
| 3,093,923 | 6/1963 | Jackson | 43/42.11 |
| 3,343,296 | 9/1967 | Davis | 43/42.28 |
| 3,546,804 | 12/1970 | Woolums | 43/42.11 |
| 4,422,260 | 12/1983 | Perrick | 43/44.80 |
| 4,467,550 | 8/1984 | Haulk | 43/42.53 |

Primary Examiner—Nicholas P. Godici
Assistant Examiner—C. McKee

[57] ABSTRACT

A sport fishing lure is quickly and easily formed by bending a length of wire back upon itself to define a shorter leg and a longer leg that extend from the bend, threading the eye of the hook onto the length of wire and positioning the eye at the bend, entwining the shorter leg and the longer leg to form a closed loop that passes through the eye of the hook, arranging the shorter and longer legs to extend side-by-side away from the closed loop, inserting skirt strands between the shorter and longer legs and generally perpendicular to them, inserting both the shorter and longer legs through the lure body, pressing the lure body toward the closed loop, and bending the portion of the shorter leg that is passed through the lure body so that it lies at an angle with respect to the body passage thereby securing the lure body to the bent wire. The advantages of this method are that the hook is free to pivot in all directions and the skirt strands are securely fastened to the lure, in a desirable presentation and that the lure can be assembled very rapidly.

9 Claims, 5 Drawing Figures

METHOD OF CONSTRUCTION OF SKIRT FOR FISHING LURES

BACKGROUND OF THE INVENTION

1. Field of the Invention

The present invention is in the field of sport fishing and in particular is concerned with the method for securing skirt material to the lure bodies.

2. The Prior Art

The present invention is a type of fishing lure that includes a body, a hook, a skirt that conceals the hook, and sometimes a spinner that serves to attract the attention of the fish. Unlike the present invention, fishing lures known in the prior art typically had the hook rigidly integrated with the body, and this did not permit the hook to pivot freely in all directions. In contrast, the full range of angular movement achieved in the present invention results in a more lifelike movement of the bait. For example, the lure of the present invention is much more adaptable to use with buoyant bait.

Various techniques were used in the prior art to attach the strands or ribbons that made up the skirt to the body of the lure or to the shank of the hook. In contrast, in the present invention the strands that make up the skirt are quickly and securely attached, regardless of whether these strands consist of rubber, mylar, deer hair, plastic, etc. The method of the present invention results in a considerable saving of labor in the construction of a fish lure.

In U.S. Pat. No. 3,205,609 issued Sept. 14, 1965 to Knapton, there is shown a lure in which a double-ended hook is inserted through a body. However, the hook is not free to pivot with respect to the body, and a single ribbon-like "tail piece" extends through a passage in the body, but does not appear to be gripped by the shanks of the hook.

In U.S. Pat. No. 2,594,264 issued Apr. 22, 1952 to Riner, there is disclosed a lure and a method for constructing it. The lure consists of a number of strands of rubber, each folded in half and the bundle being held by ferrules that encircle the bundle. There is no recognizable body to the lure, and the piece of wire that holds the hook does not retain the strands.

In U.S. Pat. No. 2,651,133 issued Sept. 8, 1953, Sharps shows a lure that includes a hook whose shank extends through the body of the lure. The hook is not free to pivot with respect to the body, and tufts or feathers are said to be attached to the part of the hook that extends from the body. However, the precise manner in which the feathers are attached is not disclosed.

In French Pat. No. 1,309,423 issued Oct. 8, 1962, Maillet and Chalom disclose a lure that is constructed by first attaching some feathers to a wire, then inserting the wire into a body and finally attaching a hook to the free end of the wire that extends beyond the body. Thus, the feathers are on one end of the body and the hook is at the other end of the body. Further, the hook is not free to pivot with respect to the body.

In U.S. Pat. No. 2,214,668 issued Sept. 10, 1940 to Erickson, there is shown a spoon hook lure to which is attached a bundle of feathers that are bound together at one end, but the feathers are not secured against the body of the lure; the feathers appear to extend from a ferrule.

Thus, although numerous techniques have been employed for constructing a lure, it appears that the advantageous technique of the present invention has not previously been known.

SUMMARY OF THE INVENTION

The present invention includes a more efficient method of constructing a fishing lure. The fabrication and attachment of the skirt material is superior in that a simple and reliable technique is used to secure the strands of the skirt to the body of the lure.

In the present invention, a wire is bent back upon itself to form a loop that engages the eye of the hook. The free ends of the wire are twisted to close the loop and a bundle of skirt strands are inserted into the space between the two lengths of wire that extend from the loop. Next, the lengths of wire are inserted through the body of the lure and the exposed end of the wire is then bent to an angle with respect to the body cavity to secure the skirt filaments to the body. In this manner, the skirt strands are pressed between the body and the twisted portion of the wire, and the hook is free to pivot on the loop formed in the wire.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
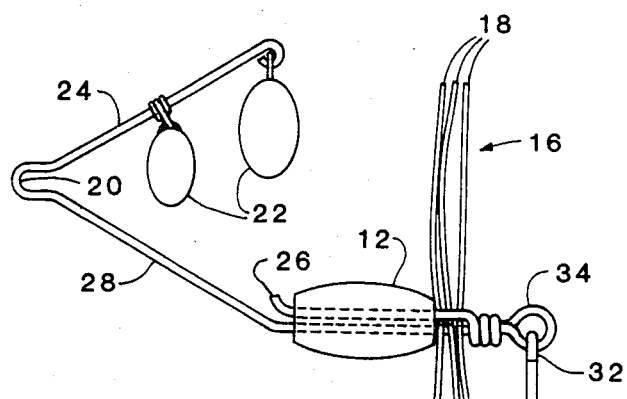
FIG. 1 is a side elevation view showing the assembled lure of the present invention.

Turning now to the drawings in which the same reference numeral is used to denote like parts throughout, FIG. 1 shows the assembled fish lure of the present invention. The major parts of the lure include the body 12, the hook 14, and the skirt 16 which in a preferred embodiment consists of a number of strands of rubber, but which in other embodiments may consist of strands or ribbons of mylar, deer hair, feathers, plastic, etc. The color of the strands may be selected for maximum effectiveness.

As will be described below, the entire lure is held together by a piece of wire which includes a shorter leg 26, a longer 28, and a loop 34. An extension arm 24 of the longer leg 28 may be used for suspending the spinners 22, and the longer leg 28 may include a bight 20 to which the line would normally be attached. Not only does the aforementioned piece of wire hold the entire lure together, but I have discovered a technique for assembling the lure that is remarkably easy and efficient. That procedure will be described in connection with FIGS. 2–5.

Figure 2:
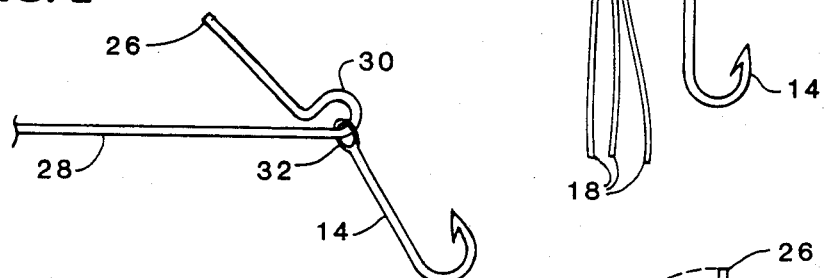
FIG. 2 is a side elevation view showing part of the lure after a first stage of construction.
Figure 3:
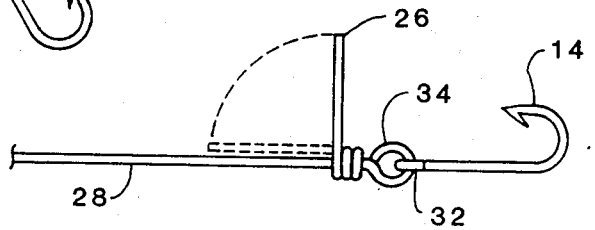
FIG. 3 is a side elevation view showing the parts of the lure shown in FIG. 2 after a further stage in the construction.

As shown in FIG. 2, a portion 26 of a piece of wire is bent back upon itself to define a shorter leg 26 and a longer leg 28 that extend from the bend 30. The eye 32 of the hook 14 is threaded onto the bent piece of wire and positioned to lie at the bend 30. In the best mode of practicing the invention, the piece of wire is bent around a slightly tapered mandrel to produce a bend 30 of circular shape and of controlled diameter.

In the next step, the shorter leg 26 and the longer leg 28 are entwined to form a closed loop 34 that extends through the eye 32 of the hook 14. This permits the hook 14 to pivot in all directions freely and yet retains the hook 14 securely to the piece of wire.

In the best mode of practicing the invention, the shorter leg 26 is twisted about the longer leg 28. In yet another embodiment, the longer leg 28 is twisted about the shorter leg 26. In each of these embodiments, the shorter leg 26 and the longer leg 28 will be seen to be entwined.

After the shorter leg 26 and the longer leg 28 have been entwined, they are bent to lie side-by-side.

Figure 4:
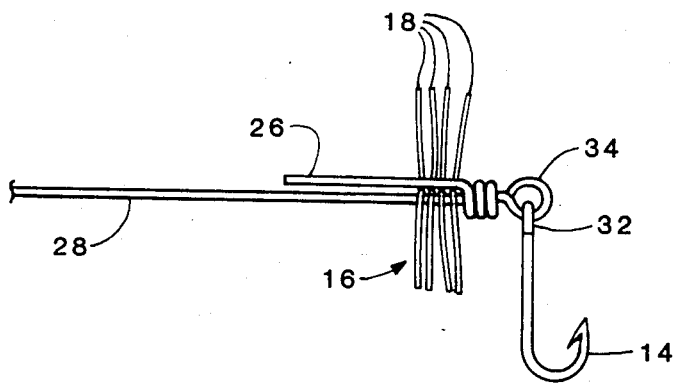
FIG. 4 is a side elevation view showing the lure at a later stage of construction than FIG. 3; and, FIG. 5 is a side elevation view showing the lure at a still later stage of construction from that shown in FIG. 4.

The next step in forming the lure is shown in FIG. 4. In that step, the strands 18 are inserted between the shorter leg and the longer leg in a direction that is generally perpendicular to those legs. In the best mode of practicing the invention, a bundle of such strands 18 is inserted in a single operation between the leg 26 and the leg 28. The bundle is placed into the crotch between the two legs.

Figure 5:
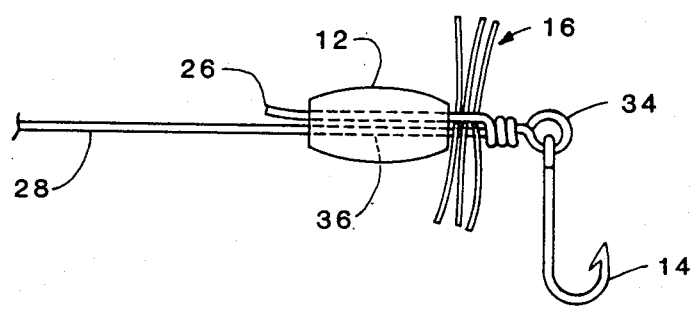

As indicated in FIGS. 1 and 5, the body 12 includes a passage 36 through it. Other than that, the body may have any desired shape. As indicated in FIG. 5, the shorter leg 26 and the longer leg 28 are inserted through the passage 36 through the body 12 and thereafter, the body 12 is pressed against the strands 18 to urge them toward the loop 34. Thereafter, the shorter leg 26 is bent flush with body openings so as to retain the rubber strands in the position shown in FIG. 1. The exposed portion of the shorter leg 26 is clipped off to a more desirable length. Also, if the longer leg 28 is thereafter formed to the shape shown in FIG. 1, it is desirable that the end of the shorter leg 26 be bent upwardly as shown in FIG. 1 to prevent it from snagging on water plants and the like.

I have found that when the lure is assembled in the manner just described, the strands 18 are held securely to the lure and have no tendency to work loose. Also, the hook 14 can pivot freely in all directions. The technique is usable for bodies of various shapes, so long as the body includes an internal passage through it.

Thus, there has been described a fishing lure having a particularly desirable structure in that the skirt strands are easily and securely fastened to the lure. A method of assembling the lure has been described, and it permits very rapid assembly of the lure.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. A method for securing skirt strands and a hook having an eye to a lure body, comprising the steps of:
    (a) bending a length of wire back upon itself to define a shorter leg and a longer leg that extend from the bend;
    (b) threading the eye of the hook onto the length of wire and positioning the eye at the bend;
    (c) entwining the shorter leg and the longer leg to form a closed loop that passes through the eye of the hook;
    (d) arranging the shorter and longer legs to extend side-by-side away from the closed loop;
    (e) inserting skirt strands between the shorter and longer legs and generally perpendicular to them;
    (f) inserting both the shorter and longer legs through the lure body;
    (g) pressing the lure body toward the closed loop;
    (h) bending the portion of the shorter leg that has passed through the lure body to lie at an angle with respect to the longer leg, to secure the skirt strands.

2. The method of claim 1 wherein step (c) further comprises winding the shorter leg around the longer leg.

3. The method of claim 1 wherein step (c) further comprises winding the longer leg around the shorter leg.

4. The method of claim 1 wherein step (c) further comprises twisting together the shorter leg and the longer leg.

5. The method of claim 1 wherein step (a) further comprises bending the length of wire around a mandrel.

6. The method of claim 5 wherein step (c) further comprises twisting the mandrel while holding the shorter leg and the longer leg.

7. The method of claim 1 wherein step (h) further comprises bending said portion of the shorter leg in such a direction that said portion will not snag on water plants when the lure is used.

8. The product made by the process of claim 1.

9. A lure of the type that includes a hook having an eye and that includes a bundle of skirt strands, said lure comprising:
    a body that includes a passage through it;
    a length of wire that includes a shorter leg and a longer leg, said shorter leg and said longer leg entwined to form a loop that links through the eye of the hook, the free portions of said shorter leg and said longer leg passing on opposite sides of the bundle of skirt strands and extending through said passage so that the bundle of skirt strands is secured between said longer leg and said shorter leg against said body.

* * * * *